July 19, 1966
W. F. MORRISON
3,261,907
HIGH FREQUENCY POWER CABLE
Filed March 30, 1964
2 Sheets-Sheet 1
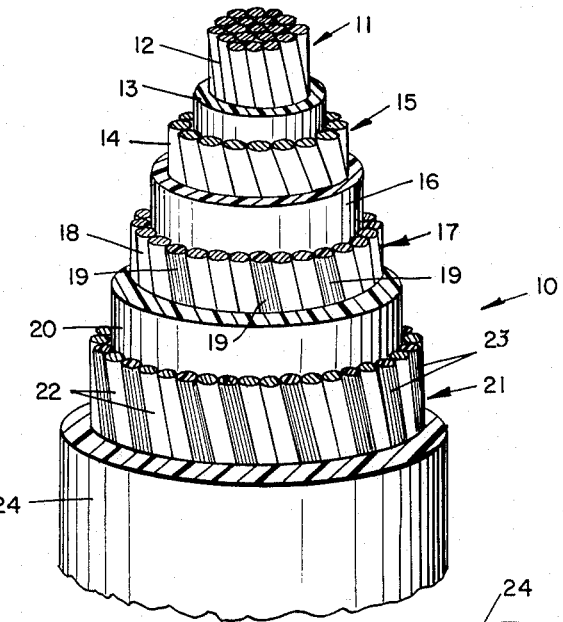
FIG. 1
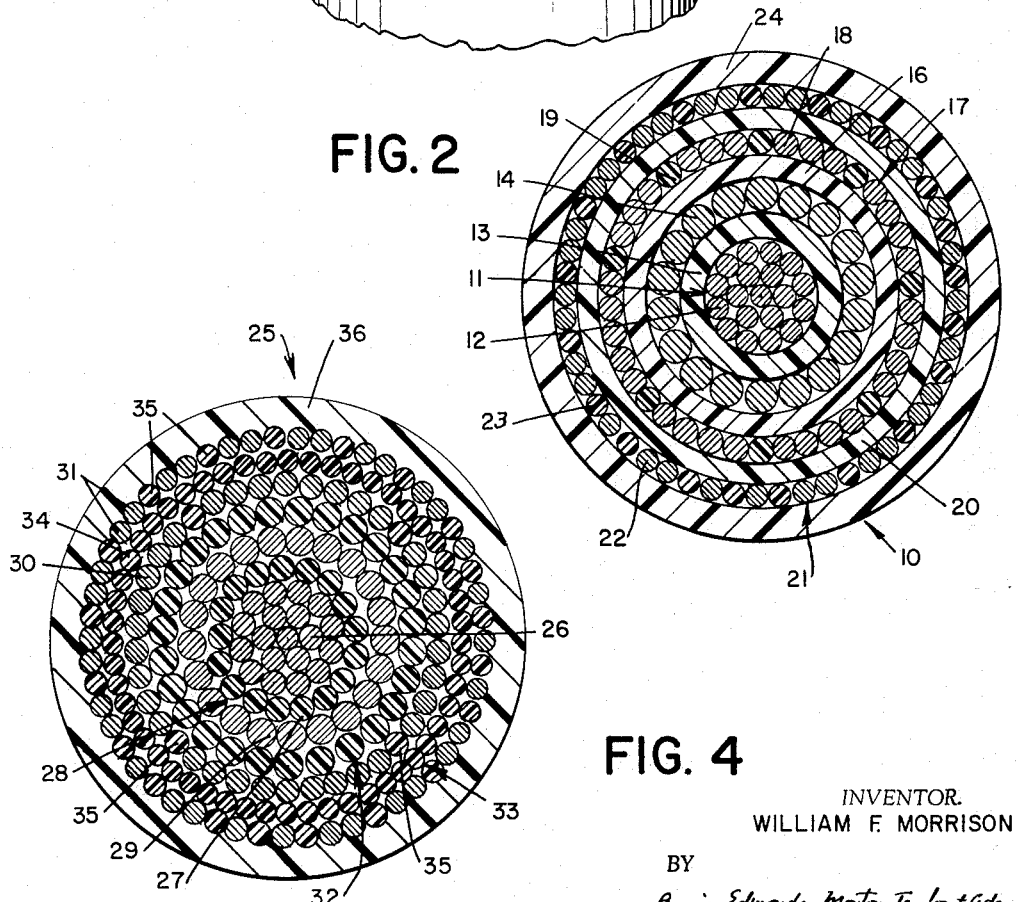
FIG. 2
FIG. 4
INVENTOR.
WILLIAM F. MORRISON
BY
*Bonnie, Edmonds, Morton, Taylor & Adams*
ATTORNEYS

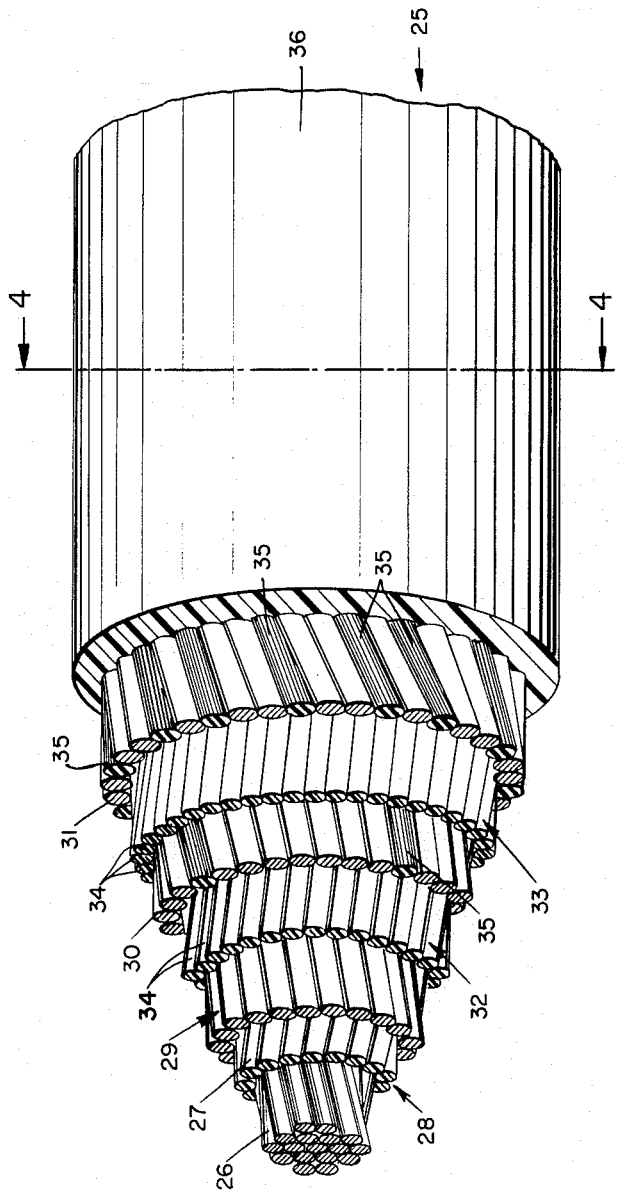

3,261,907
HIGH FREQUENCY POWER CABLE
William F. Morrison, Irvington, N.Y., assignor to Anaconda Wire and Cable Company, New York, N.Y., a corporation of Delaware
Filed Mar. 30, 1964, Ser. No. 355,577
6 Claims. (Cl. 174—115)

This invention relates to a high frequency power cable and, more particularly, to a power cable that can be used advantageously on high frequency low voltage polyphase power circuits at frequencies above 300 cycles per second, but within the audio frequency range.

Compared with the standard 60-cycle system for power applications, high frequency systems are preferable where, for a given power requirement, more compact and lighter weight equipments are required. For example, the 400-cycle system is used in the power circuits for aircraft and surface ships where compact and lightweight equipments are highly desirable. However, when conventional cables are used for polyphase circuits, the high frequency system greatly increases the inductive voltage drop of the line and the A.C. resistance to D.C. resistance ratio. As a result, a larger size power cable and higher power requirement are needed, which in effect offset some important advantages of the high frequency system.

I have now found that these electrical difficulties presented in high frequency polyphase circuits can be overcome by using cables with multiple conductors concentrically arranged and interposed with concentric layers of insulation. Cables of this type have substantially lower impedances due to the concentricity of the electromagnetic fields of all the phases; consequently, the voltage drop in the line is drastically reduced. The inherent physical shape of each concentrical layer of conductors resembles that of the "hollow core" type cables, which effectively reduces the skin effect of the cable and improves the A.C. resistance to D.C. resistance ratio. The concentric arrangement of conductors, which presents a more compact cable than the conventional multiple conductor cables, further eliminates the high frequency field surrounding the cable for a balanced polyphase circuitry because the field of all phases would add up to zero; thus, it provides a cable particularly suitable for high frequency polyphase power circuits.

Accordingly, the high frequency power cable of this invention for a polyphase circuit comprises a center electrical conductor, a first layer of dielectric material surrounding the center conductor, a first layer of electrical conductor surrounding the first layer of dielectric material for carrying one phase of the electrical current of the polyphase circuit, and a second layer of dielectric material insulating the first layer of conductor. At least one additional layer of conductor is used surrounding the second layer of dielectric material and each of these additional layers of conductors carries a separate phase of electrical current for the polyphase circuit and is separated from each other by a layer of dielectric material. An outer jacket of dielectric material is provided to cover the last layer of conductor.

The conductors used in the cable are conventional electrically conductive wires. The center conductor is preferably a standard concentrically stranded copper conductor. Each layer of conductors comprises a plurality of electrically conductive wires surrounding the outer periphery of the concentric layer of dielectric material to form a stranded concentric single layer of conductors. The total cross-sectional area of each layer should be adjusted so that the resistance for one layer of conductors at substantially balanced load conditions is approximately equal to the resistance of other layers. The adjustment of total cross-sectional area of each conductor layer can be made by using a predetermined number of wires with different cross sections for each layer. Since the outer diameter of the cable increases with each additional layer of conductors, the total cross sections of electrical conductor in the outer layer can be adjusted using more wires with progressively smaller diameter. Alternatively, I found it to be convenient to adjust the total cross-sectional area in conductive layers by adding non-conductive wires together with the conductive wires to form the conductor layers. The number of non-conductive wires can be varied and equally spaced around the periphery of the dielectric material to form the conductive layer. For the latter method, the diameters of the conductive and non-conductive wires and the wires among each layer can be the same.

The dielectric material forming the non-conductive concentric insulating layers can be of any conventional insulating materials and preferably they are the extrudable synthetic rubbers and plastics such as polyethylene, vinyl chloride and vinyl acetate copolymers, styrene copolymer, tetrafluoroethylene polymer, butadiene copolymer and chloroprene polymer. The insulation can be a continuous concentric layer of extruded dielectric materials surrounding individual layers of wires. It can also be formed from a plurality of non-electrical conductive wires of extrudable dielectric material or glass fibers coated with polyepoxide or other plastics to surround the layer of conductors. When non-conductive wires are used for the insulation layers, the diameter of all the non-conductive and conductive wires are preferably the same which allows the formation of the cable core in one or two manufacturing operations on a conventional planetary type strander. Using the same diameter wire for all layers has the added advantage that the inductive reactance is independent of the wire diameter. In other words, the inductive reactance of all cables of this type would be equal even if the conductors may have different cross sections.

Further, to illustrate applicant's invention, specific embodiments are described hereinbelow with reference to the accompanying drawing wherein FIG. 1 is a perspective view of one embodiment of applicant's high frequency cable with progressively longer end portions for each succeeding layer, removed to expose the structure of the cable, FIG. 2 is a top view of FIG. 1, FIG. 3 is a perspective view of the second embodiment of applicant's high frequency cable with progressively longer end portions of each succeeding layer removed to expose the structure of the cable, and FIG. 4 is a cross section taken from line 4—4 of FIG. 3.

Referring initially to FIGS. 1 and 2, the high frequency power cable 10 of this invention has a center conductor 11 consisting of concentrically stranded copper wires 12. A first concentric insulating layer 13 of extruded high molecular weight polyethylene covers the center conductor 11, which, in turn, is surrounded by a single layer of copper wires 14 helically wound around the outside periphery of the insulating layer 13 forming a first concentric layer of conductors 15. A second concentric layer 16 of extruded high molecular weight polyethylene is provided around the first layer of conductors 14 to insulate conductors 15 from an outer layer 17 of copper wires 18. These wires 18 together with polyethylene wires 19 are wound helically around the insulation layer 16. A third concentric layer 20 of extruded high molecular weight polyethylene is used to insulate conductor layer 17 from the outer layer of conductors 21 which consists of copper wires 22 and non-conductive polyethylene wires 23 helically wound around the outer periphery of the insulation layer 20. The cable core is then covered with an outer jacket 24 of extruded black, high molecular weight polyethylene.

The cable shown in this specific embodiment can be used advantageously for four wire-three phase power circuitry in which the center stranded conductor 11 serves as a neutral conductor and each additional concentric layer of wires carries a separate phase for the circuit. The total copper in each successive conductor layer utilizes more individual wires of a smaller diameter than the previous layer. Accordingly, the diameter of the wires 14 in the first concentric layer 15 is the largest, and the succeeding layers 17 and 21 have progressively smaller diameters. The resistance for each layer of conductors is adjusted by using dummy non-electrical conductive polyethylene wires 19 and 23 for the second and third layers of conductors respectively. These polyethylene wires are equally spaced around the circles of wires.

In this cable, the insulation layer 13 of extruded high molecular weight polyethylene is sufficiently thick to withstand the voltage to ground of the system. The insulation layers 16 and 20, which concentrically separate three layers of conductor, have the thickness to withstand the phase to phase voltage. The outer jacket 24, in addition to having sufficient dielectric strength to withstand the voltage to ground of the system, also has sufficient physical and chemical strengths to offer suitable mechanical and weathering protection for the cable. A specific example illustrating the physical and electrical characteristics of a four concentric conductor cable designed specifically for 400 cycle power circuitry, as previously described, is tabulated below in Tables I and II.

TABLE I

*Physical characteristics*

Neutral conductor—19 x 0.0526 inch stranded copper wires
1st layer insulation—60 mils thick (nominal) extruded polyethylene
1st concentric layer of conductors—18 x 0.0760 inch copper wires
2nd layer insulation—55 mils thickness (nominal) extruded polyethylene
2nd concentric layer of conductors—30 x 0.0595 inch copper wires plus 4 x 0.0595 inch polyethylene wires
3rd layer insulation—55 mils thickness (nominal) extruded polyethylene
3rd concentric layer of conductors—33 x 0.0547 inch copper wires plus 20 x 0.0547 inch polyethylene wires
Jacket—80 mils thickness (nominal) extruded black high molecular weight polyethylene
Approximate outside diameter—1.20 inches
Approximate net weight—1.31 lbs./ft.

TABLE II

*Electrical characteristics*

| | |
|---|---|
| Voltage rating _____volts__ | 300 |
| Current rating _____amperes__ | 175 |
| Frequency _____cycles__ | 400 |
| Resistance _____ohms/M ft__ | 0.101 |
| Reactance _____ohms/M ft__ | 0.0312+0.0224 |
| Impedance _____ohms/M. ft__ | 0.0846 |

Referring now to FIGS. 3 and 4 which show the second embodiment of this invention. The four concentric conductor cable 25 is constructed similarly as that of the previously described embodiment shown in FIGS. 1 and 2 with the exception that the concentric layers of insulation consist of multiple non-conductive wires helically wound around each concentric layer of conductors. Specifically, the center conductor 26 is insulated by a plurality of polyethylene wires 27 which form a concentric insulation layer 28. Additional concentric layers of conductors 29, 30, and 31 are provided concentrically around the center conductor 26 with interposed insulation layers 32 and 33 separating them. Each of the insulation layers consists of a plurality of polyethylene wires 34 wound helically around the peripheries of the conductor layers. Similar to the first embodiment, the outside layers of conductors are filled with dummy non-electrical conductive wires 35 to balance the resistance for the conductors carrying separate phases of the circuit. The conductor core of the cable is covered with jacket 36 of extruded black high molecular weight polyethylene.

The lay direction of the polyethylene wires is preferably opposite to that of the conductor wires such that the cable can be produced conveniently and economically by the conventional planetary type strander. When such process is used, it is advantageous to use wires of the same diameter to produce a cable so that the thickness of each layer is about the same, and thus the inductive reactance is independent of the wire diameter. In other words, the inductive reactance of all cables of this type would be equal even if the conductors are of different cross sections.

While both embodiments illustrated are specifically adapted for four-conductor three phase power circuits, the number of conductors can be three or more for other polyphase application. In general, the cable of this invention obtains its real advantages for power application at frequencies of 400 cycles or more but within the audio frequency range. It can also be used at a lower frequency range where the concentricity of conductors provides a more compact cable.

I claim:
1. A high frequency power cable for a polyphase circuit comprising a center core of concentrically stranded electrically conductive wires, a first continuous layer of dielectric material surrounding said central core, a plurality of electrically conductive wires surrounding said first layer of dielectric material forming a first concentric single layer of conductors for carrying one phase of said circuit, a second continuous layer of dielectric material insulating said first layer of conductors, a plurality of electrically conductive wires surrounding said second layer of dielectric material forming at least one additional concentric single layer of conductors, each of said additional layers of conductors carrying a separate phase for said circuit and being separated from each other by a concentric continuous layer of dielectric material, and an outer jacket of dielectric material covering said layers of conductors, each of said concentric layers of conductors having a predetermined number of electrically conductive wires with a total cross sectional area of the conductors in each layer being approximately balanced by non-electrically conductive wires to produce closely resembled resistances for all phases, each of said layers of dielectric material having sufficient dielectric strength to withstand the voltage between the adjacent layers of conductors.

2. A high frequency power cable for a low voltage three phase circuit comprising a center core of stranded electrically conductive wires served as a neutral conductor for said cable, a first continuous layer of dielectric material having sufficient dielectric strength to withstand the voltage to ground of said cable and surrounding said center core, a plurality of closely spaced uniform and electrically conductive wires surrounding said first layer of dielectric material forming a first concentric single layer of conductors for carrying one phase of said circuit, a second continuous layer of dielectric material concentrically surrounding said first layer of conductors and capable of providing phase-to-phase insulation to said first layer of conductors, a plurality of uniform and electrically conductive wires surrounding said second layer of dielectric material forming a second concentric layer of conductors and carrying a second phase of said circuit, a third layer of continuous dielectric material concentrically surrounding said second layer of conductors and capable of withstanding the phase-to-phase voltage of said cable, a plurality of uniform and electrically conductive wires surrounding said third layer of dielectric material forming a third concentric layer of conductors for the remaining phase of said three phase circuit, and an outer jacket of dielectric material covering said last layer of conductors, each of said concentric layers of conductors having a predetermined number of electrically conductive wires to provide a total cross-sectional area of the conductors in each layer that produces a resistance during service closely resembling the resistances of other two phases and the total cross-sectional area of each second and third layers of conductors being balanced by non-electrically conductive wires equally spaced within the circles of the concentric layers.

3. A high frequency power cable of claim 2 wherein the continuous dielectric material is extruded polyethylene and the non-electrically conductive wires are polyethylene wires having the same diameters as their corresponding electrically conductive wires of the same layer.

4. A high frequency power cable of claim 2 wherein the uniform and electrically conductive wires in each layer are copper wires and the cross-sectional areas of wires in one layer are smaller than the cross-sectional areas of wires in the preceding layer.

5. A high frequency power cable for a three phase circuit comprising a center core of concentrically stranded electrical conductive wires served as a neutral conductor for the cable, a first layer of closely spaced non-electrically conductive wires of a dielectric material concentrically surrounding said center core, a plurality of electrical conductive wires concentrically surrounding said first layer of non-electrically conductive wires forming a first concentric single layer of conductors for carrying one phase of said three phase circuit, a second layer of closely spaced non-electrically conductive wires of a dielectric material insulating said first layer of conductors, a plurality of electrically conductive wires concentrically surrounding said second layer of non-electrically conductive wires forming a second single layer of conductors carrying a second phase of said three phase circuit, a third layer of non-electrically conductive wires concentrically surrounding said second layer of conductors, a plurality of electrically conductive wires concentrically surrounding said third layer of non-electrically conductive wires forming a third layer of conductors for carrying the remaining phase of the three phase circuit, and an outer jacket of dielectric material covering said layers of conductors, each of said concentric layers of electrically and non-electrically conductive wires having substantially the same diameter and the total cross-sectional areas of the conductors in each concentric layer being balanced by equally spaced non-electrically conductive wires so as to produce a resistance during service closely resembling that of the other phases, each of said layers of non-electrical conductive wires having sufficient dielectric strength to withstand the voltage between the adjacent layers of conductors.

6. A high frequency power cable of claim 5 in which the electrically conductive wires are copper and the non-electrically conductive wires are polyethylene wires having the same diameter as that of said electrically conductive wires.

References Cited by the Examiner

UNITED STATES PATENTS

| 1,757,030 | 5/1930 | Watson et al. | 174—116 X |
| 2,075,996 | 4/1937 | Noyes | 174—105 |
| 2,870,311 | 1/1959 | Greenfield et al. | 174—28 X |

FOREIGN PATENTS 842,945  7/1960  Great Britain.

OTHER REFERENCES

Du Pont Plastics Bulletin No. 44, vol. 11, p. 176, 1949.

ROBERT K. SCHAEFER, *Primary Examiner.*

JOHN F. BURNS, *Examiner.*

D. A. KETTLESTRINGS, *Assistant Examiner.*